US010689177B2

(12) United States Patent
Broen et al.

(10) Patent No.: US 10,689,177 B2
(45) Date of Patent: Jun. 23, 2020

(54) RESEALABLE PACKAGES FOR SNACK PRODUCTS

(71) Applicant: Frito-Lay North America, Inc., Plano, TX (US)

(72) Inventors: Martin E. Broen, New York City, NY (US); Todd Huthmaker, McKinney, TX (US); Chad Huebner, Plano, TX (US); David Lestage, Allen, TX (US)

(73) Assignee: Frito-Lay North America, Inc., Plano, TX (US)

( * ) Notice: Subject to any disclaimer, the term of this patent is extended or adjusted under 35 U.S.C. 154(b) by 76 days.

(21) Appl. No.: 15/729,912

(22) Filed: Oct. 11, 2017

(65) Prior Publication Data

US 2019/0106257 A1   Apr. 11, 2019

(51) Int. Cl.
*B65D 77/02*   (2006.01)
*B32B 37/12*   (2006.01)
(Continued)

(52) U.S. Cl.
CPC ...... *B65D 75/5855* (2013.01); *B32B 37/1292* (2013.01); *B65D 75/566* (2013.01);
(Continued)

(58) Field of Classification Search
CPC ............ B65D 75/5855; B65D 75/5838; B65D 77/02; B65D 77/00; B65D 75/40;
(Continued)

(56) References Cited

U.S. PATENT DOCUMENTS 4,787,517 A * 11/1988 Martin ................. B65D 33/165
                                                     383/203
5,730,288 A *  3/1998 Weisburn ........... G11B 23/0233
                                                     206/387.1
(Continued)

FOREIGN PATENT DOCUMENTS

FR        2577897 A1 *  8/1986  ......... B65D 77/2056
GB        1524548 A   *  9/1978  ........... B65D 77/206
WO    2009065663 A1     5/2009

OTHER PUBLICATIONS

PCT Search Report and Written Opinion for PCT/US18/54399 dated Dec. 31, 2018 (10 pages).

*Primary Examiner* — Rafael A Ortiz
(74) *Attorney, Agent, or Firm* — Barnes & Thornburg LLP; G. Peter Nichols

(57) ABSTRACT

Disclosed are unique resealable packages for snacks. Some embodiments comprise rigid sidewalls configured to structurally support a flexible bag to maintain the thickness of the bag as it is laid on its back and opened for product consumption. In addition, disclosed packages include a resealable flexible flap having a raised pull tab for use by a consumer to peel open the bag by separating this flap from the front of the bag, and then resealing the bag by laying the flap back over the opening. The rigid sidewalls allow the integrity of the product to be maintained after the bag is resealed so that the product is not crushed if the bag is stored for later use. Edges of the peelable flap are coated with a resealable adhesive, while one side or end of the flap is connected to a portion of the bag's front surface.

25 Claims, 7 Drawing Sheets

(51) Int. Cl.
   *B65D 75/56* (2006.01)
   *B31B 170/20* (2017.01)
   *B31B 160/20* (2017.01)
   *B65D 75/58* (2006.01)

(52) U.S. Cl.
   CPC ......... *B65D 75/5838* (2013.01); *B65D 77/02* (2013.01); *B31B 2160/20* (2017.08); *B31B 2170/20* (2017.08)

(58) Field of Classification Search
   CPC ... B65D 1/40; B65D 1/42; B65D 1/44; B65D 1/46; B65D 1/48; B65D 11/20; B65D 11/22; B65D 11/24; B65D 11/26; B65D 81/34; B65D 85/72; B65D 75/525; B31B 2170/00; B31B 2170/20; B31B 2160/00; B31B 2160/20; B32B 37/1292; B32B 37/12; Y10S 229/9041; Y10S 224/907; Y10S 229/927
   USPC .......... 220/669, 62.13, 62.11, 680, 678, 677, 220/646, 650, 639, 660, DIG. 11, 62.21; 426/106; 206/484, 233, 260, 410, 812
   See application file for complete search history.

(56) References Cited

U.S. PATENT DOCUMENTS

| | | | |
|---|---|---|---|
| 8,844,757 B2* | 9/2014 | Wilmers | B65D 75/326 220/608 |
| 2004/0206637 A1* | 10/2004 | Sierra-Gomez | B65D 75/5838 206/1.5 |
| 2005/0252914 A1* | 11/2005 | Hubbard | B65D 61/00 220/62.11 |
| 2005/0276525 A1 | 12/2005 | Hebert et al. | |
| 2008/0156861 A1* | 7/2008 | Sierra-Gomez | B65D 75/5838 229/214 |
| 2010/0111453 A1* | 5/2010 | Dierl | B65B 9/213 383/204 |
| 2011/0174325 A1* | 7/2011 | Saint-Girons | B65D 75/5844 131/347 |
| 2012/0321753 A1* | 12/2012 | Michels | B65D 81/3461 426/107 |
| 2013/0004626 A1* | 1/2013 | Renders | B65D 33/02 426/121 |
| 2019/0031402 A1* | 1/2019 | Lyzenga | B65D 77/2096 |

* cited by examiner

RESEALABLE PACKAGES FOR SNACK PRODUCTS

TECHNICAL FIELD

The present disclosure relates to snack packages, and in particular to unique resealable snack packages.

BACKGROUND

Flexible packages have been used for some time to provide snack foods to consumers. However, the majority of conventional single serving bags (e.g., approximately 1-2 oz.) do not provide a premium consumer experience when attempting to access and consume the product within. Current small bags typically open at an end seam, and thus grasping and pulling an end seam apart with the hands is not a pleasant and convenient way to open the package. Not only can this prove difficult to do on those packages having extensive end seals, but often times as the end seal gives way to the pulling force of the consumer, the package can open dramatically causing some of the contents to spill from the package. Other times, the pulling force may prove to have been too great when the sides or backseam of the package tears after the end seal gives way to the pulling force. Further, contents within flexible packages opened by the end seam are not easily accessible. Thus, the eating experience is not discreet or clean because the consumer has to dig down into a package in order to reach lower lying product, often through a narrow opening, which results in consumers' hands rubbing against the inside wall of the bag where oil and seasoning may be present.

Thus, there are a number of desirable features that manufacturers have long strived to include in flexible packages used to hold snacks or other food products. One exemplary feature is the ability to reclose a package of a snack food that is only partially eaten, so that the flavor and texture of the product are preserved as long as possible. More specifically, many times not all of a package of snack foods is consumed at one time and thus there is a desire to reclose the package to prevent moisture from causing premature staling and spoilage of the remaining contents, as well as to prevent the contents from spilling from the package and into the consumer's purse, satchel, or other type of bag carrying the remaining package. Many of the recloseable packages disclosed in the prior art utilize a mechanical reclosure means, such as interlocking mechanical profiles whereby interlocking closure means is used to close the package mouth. Use of interlocking strips, however, such as zippers or sliders, is costly and complicates the manufacture of packaging. It would be desirable to have a low-cost alternative.

One approach has been to provide a flexible package with an adhesive reclosure means, whereby at least a portion of the adhesive is adhered to the outside of the package to close the package opening when only part of the product is consumed. Referring to FIG. 1A and FIG. 1B, illustrated is a perspective view of a conventional packaging product 100 having a recloseable film 110 that provides the reclosing feature. The conventional recloseable package 100 comprises score lines 120, which pass through all the layers of the film comprising the remainder of the package 100. Aside from the score lines 120, the film 110 has edges 130 around its perimeter that include an adhesive layer 150 that is then affixed over the scored section of the package 100. As seen in FIG. 1A, the peelable film 110 has an area larger than that of the scored section defined by the score lines 120, and comprises a pull tab 140 that is free from adhesive so that a consumer can grip the pull tab 140 with ease. Thus, as the consumer grips the pull tab 140 and pulls it back in the direction of the scored section, the package film tears along the path of least resistance in the direction provided by the perforated score lines 120, creating a large flap on the top side of the package 100. An opening 160 is created in the package 100, and the adhesive layer 150 is exposed as depicted in FIG. 1B. A consumer can then consume a portion of the contents within the package 100 through the opening 160, and then reclose the opening by sticking the adhesive layer 150 back onto the outer layer of the package 100 to reduce product exposure to the surrounding environment.

Unfortunately, the prior art packages with recloseable flaps, such as those depicted in FIGS. 1A and 1B, have a number of significant disadvantages. For example, when attempting to reseal the packages, a consumer must push down along all three edges of the adhesive to adequately seal the bag. This places pressure on a significant portion of the products behind the seal of the bag as the consumer presses down on the package to reclose it. Placing pressure along the bag could cause the consumer to crush the contents remaining in the bag when it is resealed, resulting in a large amount of unwanted broken pieces or crumbs. Also, if maintaining package thickness after opening is less important to consumers as compared to the initial size of the package when carried by consumers, conventional pillow bag packages tend to feel oversized to those consumers when such packages are being carried. Specifically, current pillow bags are sealed in a manner that traps ambient air within the package along with the contents, and this trapped air maintains the package's thickness to protect the product inside from the factory, but that inflated or puffy thickness can make the conventional pillow bag difficult to carry by the consumer. In those situations, a slimmer profile package that still offers a resealing option is not offered by the current market. Also, the thickness of the inflated conventional pillow bags results in less product fitting on a product display when the bags are positioned in-line.

Therefore, there is a need for unique recloseable/resealable packages for snack products that do not suffer from these and other deficiencies found in conventional pillow bags or even those conventional packages that are recloseable. The disclosed principles provide such improved resealable packages.

SUMMARY

To overcome the deficiencies of the prior art, the disclosed principles provide for new and unique resealable packages for snacks, such as potato or corn chips, nuts, clusters, or any other type of snack food. In some embodiments, the disclosed bags include structurally rigid sidewalls. These rigid sides are configured to structurally support the bag in a way that maintains the thickness of the bag vertically as the bag is laid on its back surface and opened for product consumption. More specifically, in a typical "pillow bag" used for snacks, once the bag is opened the air escapes and when laid on its back or front surface, the thickness of the bag is lost. However, with a bag constructed according to the disclosed principles, the structurally rigid sidewalls continue to maintain the bag's thickness when laid on its back even after the bag is opened. In addition, embodiments of the disclosed packages include a resealable flexible flap having a raised pull tab for use by a consumer to peel open the bag by separating this flap from the front of the bag, and then resealing the bag by laying the flap back over the opening. Also, the rigid sidewalls of the bag allow the integrity of the product to be maintained after the bag is resealed so that the product is not crushed if the bag is stored for later use.

To assist in this resealing, edges of the peelable flap are coated with a resealable adhesive, while one side or end of the flap can be permanently adhered to a portion of the remainder of the bag's front surface. Alternatively, peelable flap is integrally formed with a portion of the bag's front surface. When the consumer peels the flap upward and laterally to open the bag and expose the product, the flap remains affixed to the bag so as not to be lost. Furthermore, the pull tab portion of the flap grasped by the consumer to peel back the flap can be sized to mate with an opening, such as a slot, at the end of the bag in the direction the flap is peeled to open the bag. Once the pull tab is engaged with this opening, the flap is held back out of the way of the opening so that it does not interfere with the consumer's reach for the product, and so it does not fall back towards the bag's surface to inadvertently close the bag when not desired. When the consumer desires to close the bag, they simply detach the pull tab from the slot, and lay the flap over the bag's opening where the resealing adhesive, which can be located on the flap or on the bag along the edges of the bag's opening, allows the bag to be resealed so that the remaining product's freshness is maintain longer than if left open and exposed.

In one embodiment of a recloseable package designed and constructed in accordance with the disclosed principles, the recloseable package may comprise a flexible package body comprising a flexible film or other flexible material. As used herein, the term "film" is used to refer to both single layer and multiple layer film or similar laminates that may be used as a flexible material for snack packages. In this embodiment, the flexible package body has a front surface and a back surface opposing the front surface, and the front and back surfaces are separated by opposing sides and opposing top and bottom end seals. Such a recloseable package may also include a recloseable flap located on the front surface and connected to the front surface at a portion of the perimeter of the recloseable flap, where the recloseable flap entirely covers an opening through the front surface of the package sized for accessing product held within the recloseable package. A resealable adhesive may then be disposed around an underside of a remainder of the perimeter of the recloseable flap, where the adhesive is configured to hold the recloseable flap onto the front surface thereby covering the opening. A pull tab may be connected to the recloseable flap and located along an area of its perimeter opposite the portion of the perimeter connected to the front surface, and such a pull tab could be made free from the adhesive for easy grasping by a consumer. In such exemplary embodiments, the recloseable package may also comprise a rigid sidewall located on each of the opposing sides, each rigid sidewall having a rigidity sufficient to provide structural support to the opposing sides by maintaining a thickness for the flexible package body, as well as an aperture formed through a center portion of the top end seal for retaining the pull tab.

In a more specific embodiment of a recloseable package in accordance with the disclosed principles, the recloseable package may again comprise a flexible package body comprising a flexible material. The flexible package body could again have a front surface and a back surface opposing the front surface, where the front and back surfaces are separated by opposing sides and opposing top and bottom end seals, and where the top and bottom end seals comprise opposing convex curvatures. Such recloseable packages may also include a recloseable flap located on the front surface and connected to the front surface at a portion of the perimeter of the recloseable flap, where the recloseable flap entirely covers an opening through the front surface of the package sized for accessing product held within the recloseable package. A resealable adhesive may be disposed around an underside of a remainder of the perimeter of the recloseable flap, where the adhesive is configured to hold the recloseable flap onto the front surface thereby covering the opening. A pull tab may again be included, which is connected to the recloseable flap and located along an area of its perimeter opposite the portion of the perimeter connected to the front surface, where the pull tab is free from adhesive and comprises retention features configured to retain the pull tab within the aperture thereby holding the recloseable flap away from the front surface of the package. Such recloseable package may also comprise a pair of elliptical rigid sidewalls located on corresponding ones of the opposing sides. Such rigid sidewalls may comprise longitudinal outer edges positioned immediately adjacent to the top and bottom end seals of the recloseable package, and opposing concave curvatures providing an hourglass shape to the recloseable package. The rigid sidewalls may be constructed with rigidity sufficient to provide structural support to the opposing sides by maintaining a thickness for the flexible package body. As in other embodiments, such exemplary embodiments of recloseable package as disclosed herein may also include an aperture formed through a center portion of the top end seal.

Numerous embodiments and advantages associated with each such embodiment are discussed in further detail below.

BRIEF DESCRIPTION OF THE DRAWINGS

The detailed description that follows, by way of non-limiting examples of embodiments, makes reference to the noted drawings in which reference numerals represent the same parts throughout the several views of the drawings, and in which.

DETAILED DESCRIPTION

In view of the foregoing, through one or more various aspects, embodiments and/or specific features, the present disclosure is intended to bring out one or more of the advantages that will be evident from the description. The present disclosure makes reference to one or more specific embodiments by way of illustration and example. It is understood, therefore, that the terminology, examples, drawings and embodiments are illustrative and are not intended to limit the scope of the disclosure.

Figure 1A:
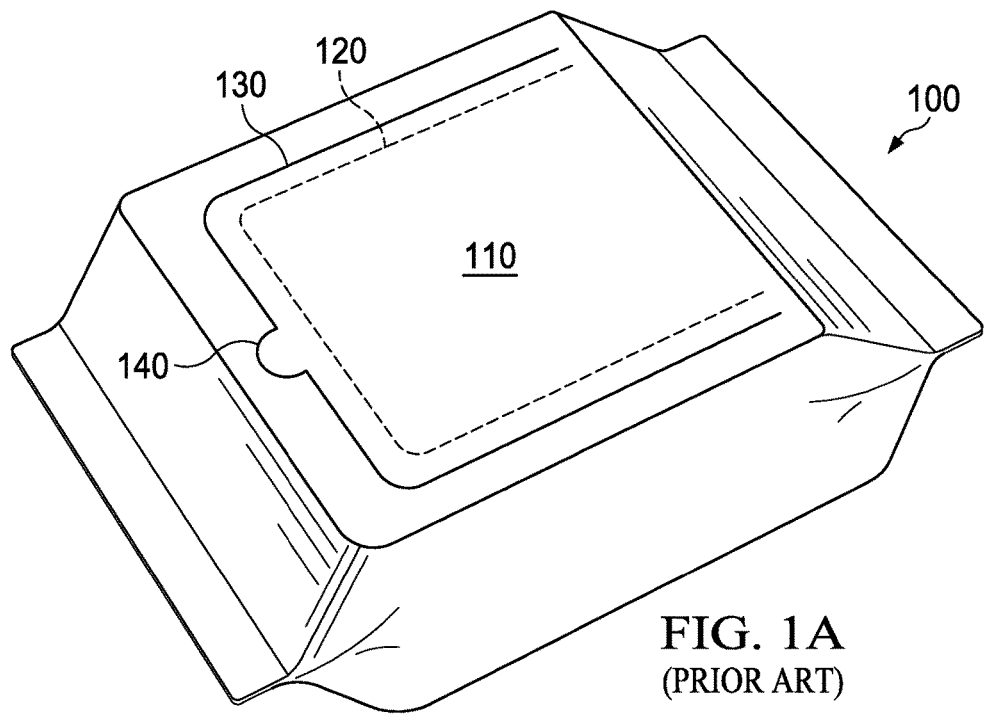
FIG. 1A illustrates a perspective view of a conventional packaging product having a recloseable flap that provides a reclosing feature for the package.
Figure 1B:
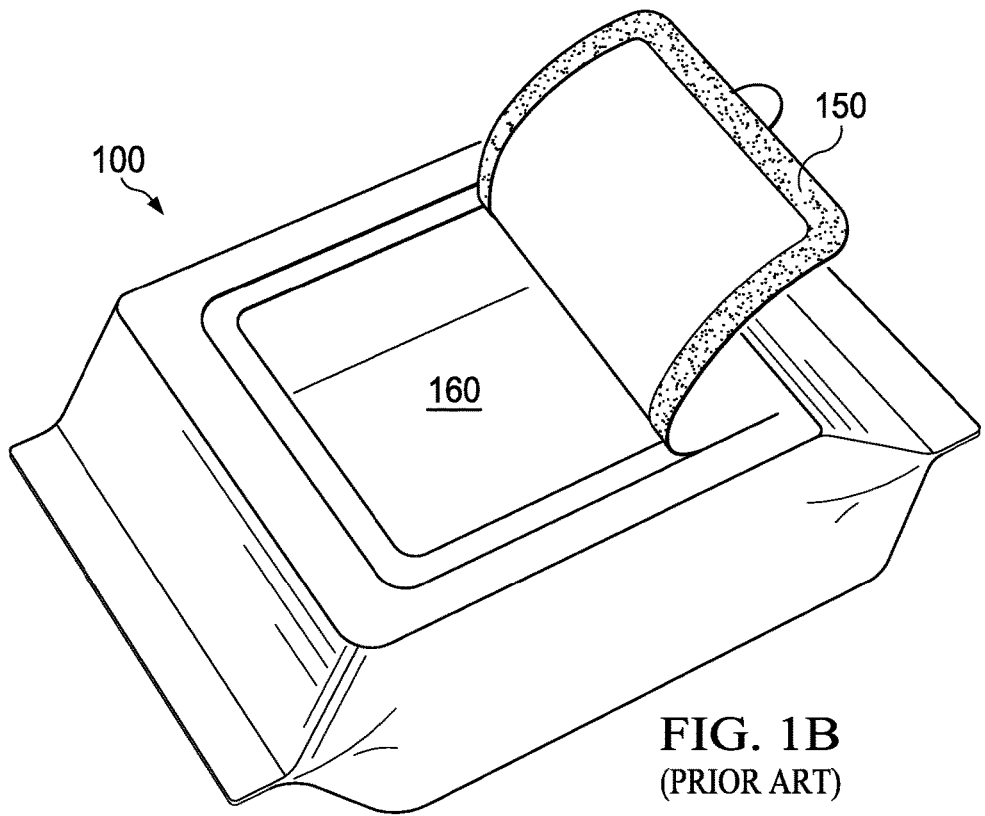
FIG. 1B illustrates a perspective view of the conventional packaging product of FIG. 1A in an opened state.
Figure 2:
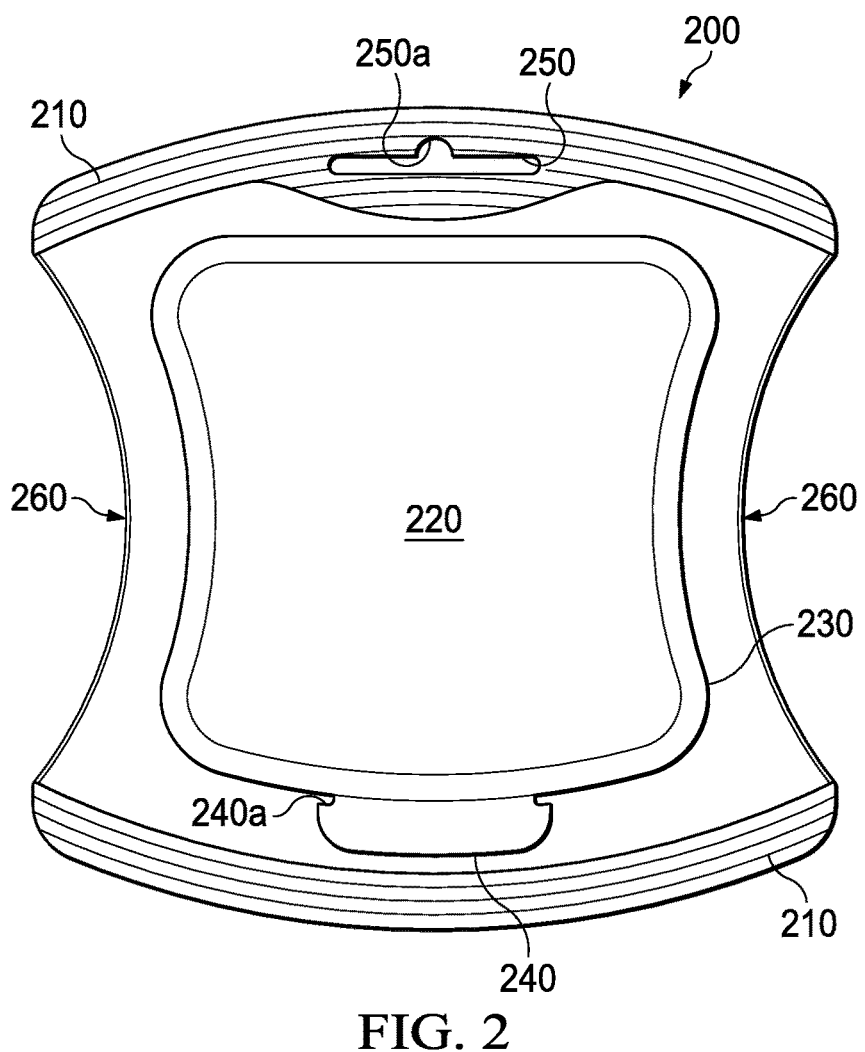
FIG. 2 illustrates a front view of one embodiment of a recloseable package constructed in accordance with the disclosed principles.

FIG. 2 illustrates a front view of one embodiment of a recloseable package 200 constructed in accordance with the disclosed principles. In this embodiment, the package 200 is a single serving sized bag, which typically holds about 1-2 oz. of product, such as potato or corn chips. The package 200 is predominately flexible, and thus includes top and bottom end seals 210 that may be closed using conventional technology, such as ultrasonic welding of the package ends.

The illustrated embodiment of the package 200 also includes recloseable flap 220 on the front of the package 200, which is used to both open and reclose the package 200. The recloseable flap 220 may be included on the package 200 in any of a number of different ways. In one embodiment, the package may include score lines (not illustrated) in the packaging material underneath the flap 220 which define the opening in the front of the package 200 where the product is accessed by a consumer. The flap 220 has peelable edges 230 around most of its perimeter that include an underside adhesive layer (not illustrated) that is then affixed over the scored front section of the package 200, while one side or corner of the flap 220 is permanently adhered to, or integrally formed with, a portion of the remainder of the bag's front surface. The recloseable flap 220 includes a pull tab 240 that is typically free from adhesive so that a consumer can easily grasp the pull tab 240. The consumer grasps the pull tab 240 and then pulls it upward and back away from the pull tab's 240 original position. As the flap 220 is pulled back with the pull tab 240, the package tears along the score lines to create a large opening on the front of the package 200.

The pull tab 240 may also include retention features 240*a* on its opposing ends. The retention features 240*a* can be used to retain the flap 220 within a slot 250 that may be formed in the top end seal 210 of the package 200. In this illustrated embodiment, the retention features 240*a* comprise small flaps extending from the opposing ends of the pull tab 240, and may be configured to be received through the slot 250. Small notches are formed next to the small flaps, and are configured to receive corresponding edges of the end seal 210 at the outer portions of the slot 250 to assist in retaining the pull tab 240. The slot 250 may also include a hanging hole 250*a* that is sized to receive a hanging peg of a product display rack so that the package 200 may be hung on the display rack. Additional details regarding the opening and reclosing of the package 200 are discussed below.

This illustrated embodiment of the package 200 also includes rigid sidewalls 260 that provide structural support to the sides of the otherwise flexible package 200. The structural support provided to the sides of the package 200 by the rigid sidewalls 220 allow the package 200 to be held in the same shape whether the package 200 has been opened or is still sealed from the factory. This vertical structural support not only protects the contents (i.e., product) within the package 200 prior to opening, but when the package 200 is opened, the rigid sidewalls 220 also create vertical structural supports that hold the package 200 in predominantly the same shape as before it was opened. Additional detail regarding the structural rigid sidewalls 260 also follows below.

Figure 3:
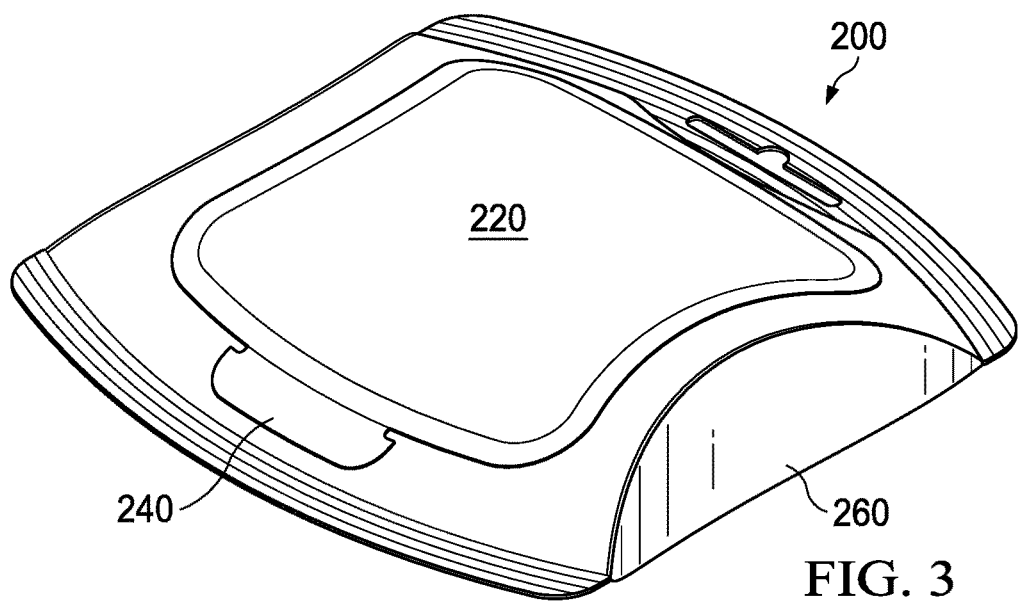
FIG. 3 illustrates a perspective view of the recloseable package illustrated in FIG. 2.

Turning to FIG. 3, illustrated is a perspective view of the recloseable package 200 illustrated in FIG. 2. In this figure, the curvature of the package 200 can be better seen, as well as the recloseable flap 220 that follows the curvature of the package 200. In addition, the pull tab 240 is also seen, which is not adhesively bound to the front surface of the package as the flap 220 is, which in turn permits easy lifting and grasping by a consumer.

Also visible from this perspective of the package 200 are the rigid sidewalls 260. As discussed above, the rigid sidewalls 260 hold the otherwise flexible package 200 in a raised, three-dimensional form. As illustrated, this embodiment of the rigid sidewalls 260 provides an ellipse-type shape, except having points at the opposing outmost edges of the rigid sidewalls 260. Including such points on the outer edges of the rigid sidewalls 260 allows the flexible film or other material comprising the remainder of the package's material to converge to a flat finish at both the top and bottom ends of the package 200 where the end seals are then formed. Of course, other shapes for the rigid sidewalls 260 may also be provided and are thus within the scope of the present disclosure. The "raised" form of the package 200 in this illustrated embodiment is selected to resemble the inflated shape of a "pillow bag," which is typically the type of bag used for packaging single serve snack bag, such as for snack chips.

Moreover, in this embodiment, the rigid sidewalls 260 are provided as opposing, inwardly curved sidewalls while maintaining a straight surface vertically, which provide an hourglass-type shape to the package 200 when viewed from the front as in FIG. 2. In the illustrated embodiment, the rigid sidewalls 260 are formed with a radius of curvature of about 3.0 inches to provide the hourglass shape for the package 200. By horizontally curving the rigid sidewalls 260, but maintaining a straight surface vertically, the rigid sidewalls 260 provide greater structural support than if totally flat rigid sidewalls 260 were provided. Such hourglass shape provided by the inwardly curved rigid sidewalls 260 at a radius of curvature of 3.0 inches further provides the appearance of a typical pillow bag that is in the inflated shape as when sealed at the factory. Of course, however, other amounts for the radius of curvature for the rigid sidewalls 260 may also be employed. Additionally, the rigid sidewalls in a package according to the disclosed principles may be curved in a convex manner, as opposed to the illustrated concave curvature of the package 200 of FIG. 3, which provides a different ornamental look than package 200, but still having the structural advantages of the hourglass shape.

Figure 4:
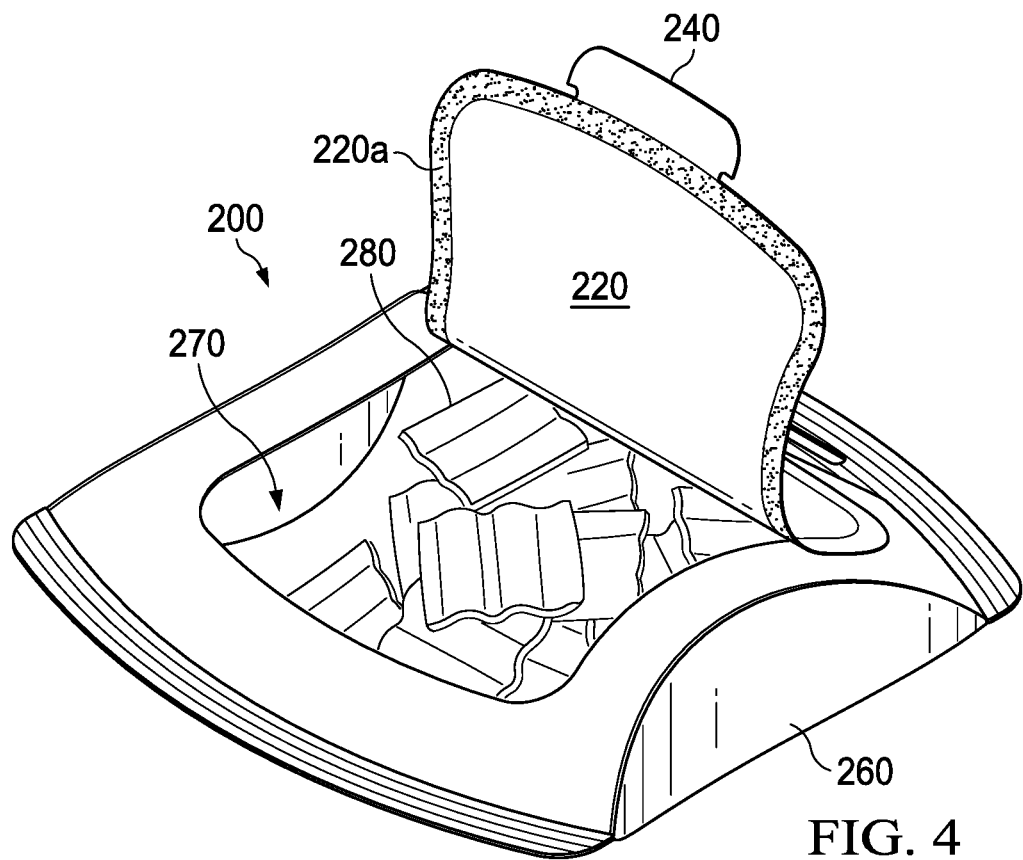
FIG. 4 illustrates a perspective view of the recloseable package of FIGS. 2 and 3 in a partially opened state.

Looking now at FIG. 4, illustrated is a perspective view of the recloseable package 200 of FIGS. 2 and 3 in a partially opened state. As illustrated, the recloseable flap 220 has been pealed upward and back, towards the top end of the package 200. As the flap 220 is so lifted and pulled, the score lines or similar perforations formed in the film or other material over the package's opening, either under the flap 220 or comprising part of the flap 220, are torn to separate the flap 220 from the remainder of the package 200. Also, the side or end of the flap 220 that is permanently attached or formed with the remainder of the bag's front surface keeps the flap 220 from being completely removed from the package 200. From the factory, the snack product is sealed within the package 200, and thus the tearing of the score lines by pulling the flap 220 provides the initial opening of the package 200.

As the package 200 is opened in this manner, the interior 270 of the package 200 is revealed, and the product 280 held within the package 280 is also exposed. In some embodiments, inner package printing may also be employed within the interior 270 to enhance the consumer experience when consuming the product 280. Such inner printing could simply be ornamental designs, or could include images or text, which could convey a message or provide other information to the consumer. For example, interior printing can provide advertisement(s), contact information (e.g., URL, social media information, etc.) which could include opportunities for promotional offers, or even information used in contests or other similar promotions.

Additionally, an adhesive border 220a located along the outer edge of the flap 220 can also be seen. This adhesive border 220a allows the recloseable flap 220 to be pulled back down over the opening of the package 200, permitting the flap 220 to reclose and even reseal the package 200 in times when the consumer has chosen to save some of the product 280 for consumption at a later time. The type of adhesive 220a that may be employed can include any type of non-permanent adhesive that is also non-toxic and otherwise safe for placing around foods intended for human consumption, for example, as approved by the U.S. Food and Drug Administration. Moreover, an adhesive that is tacky enough to reclose the flap 220 down onto the face of the package 200 should be selected, but typically not one that is so tacky that it inadvertently can stick to the fingers or hand of the consumer, which could result in the consumer accidentally lifting and spilling the contents of the package 200.

Figure 5:
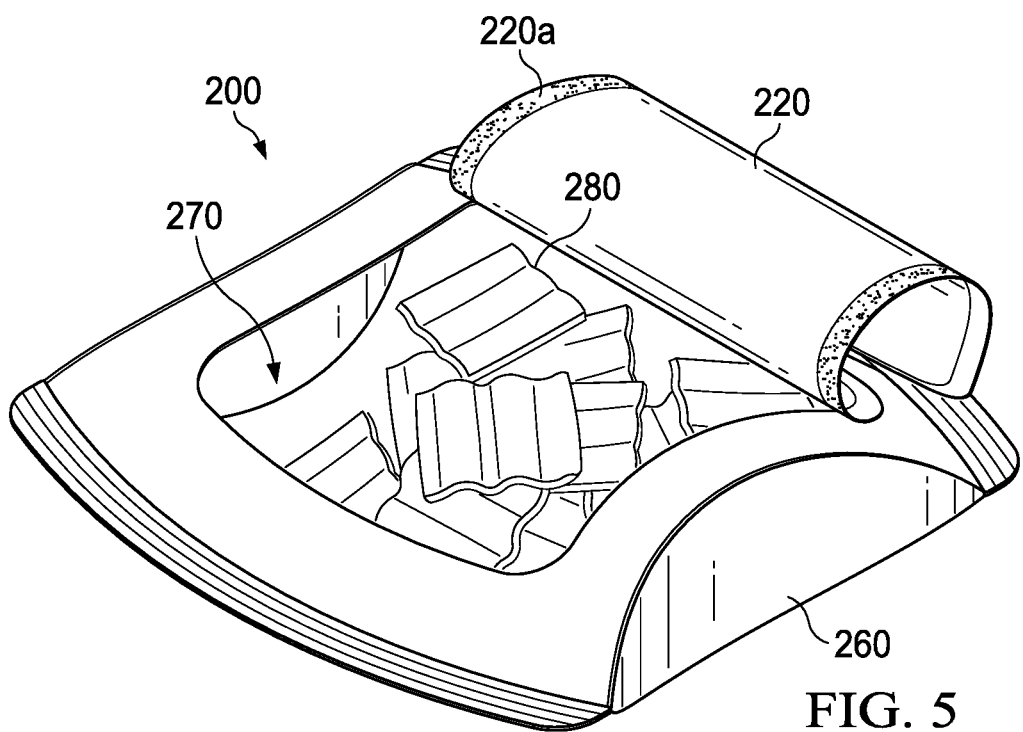
FIG. 5 illustrates another perspective view of the recloseable package of FIG. 4, in the fully opened state.

FIG. 5 illustrates another perspective view of the recloseable package 200 of FIG. 4, in the fully opened state. In the fully opened state, the recloseable flap 220 has been pulled back fully to reveal the full opening of the package 200. In addition, the flap 220 has been rolled towards the top end seal of the package 200, and the pull tab 240 retained within the slot 250 formed in the top end seal. With the flap 220 fully pulled back and retained, the consumer can now easily reach the product 280 held in the interior 270 of the package 200.

Figure 6:
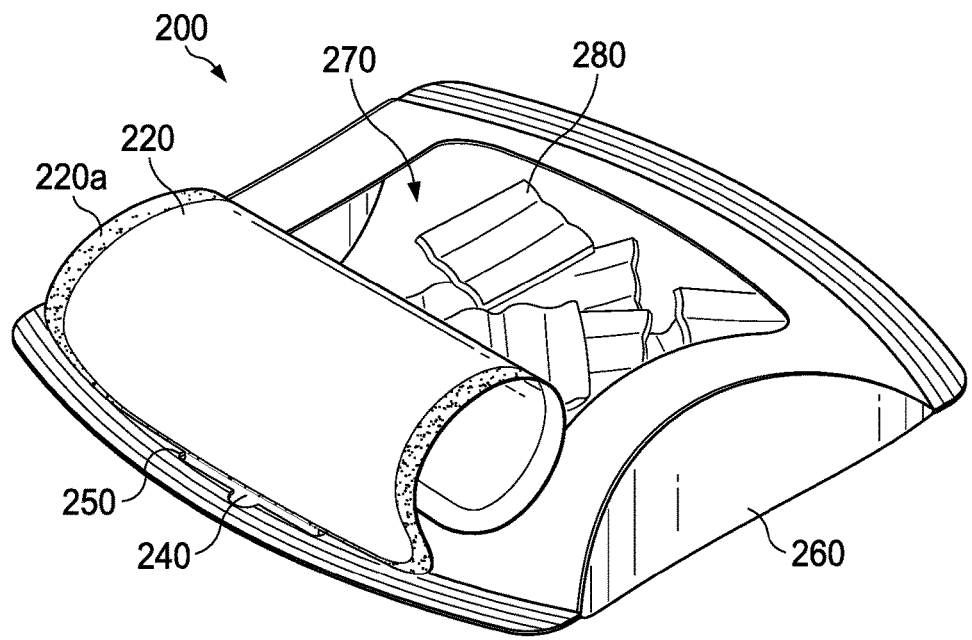
FIG. 6 illustrates a perspective view of the fully opened recloseable package shown in FIG. 5, as viewed from the top of the package.

Turning now to FIG. 6, illustrated is a perspective view of the fully opened recloseable package 200 shown in FIG. 5, as viewed from the top of the package 200. From this different viewing angle, the recloseable flap 220 can be seen rolled fully back in the open position, as well as the pull tab 240 being retained in the slot 250 formed in the top end seal of the package 200. In order to reclose the package 200, the consumer can pull the pull tab 240 from within the slot 250, and thereafter roll the flap 220 back down over the opening in the front of the package 200. The adhesive 220a along the edge of the underside of the flap 220 will then adhere to the front surface of the package 200 around the opening, allowing the consumer to reclose and reseal the package 200 until a later time, reducing product exposure to the surrounding environment. Also, by providing the rigid sidewalls 260, and in particular rigid sidewalls 260 concavely curved in the manner illustrated to provide the hourglass shape, the thickness of the package 200 is better maintained as the consumer folds the flap 220 back over the opening and gently presses on the adhesive border 220a to reseal the package 200. This vertical structural support provided by the rigid sidewalls 260 allows easier resealing of the package 200 with a reduced risk of inadvertently crushing the product 280 remaining in the package 200. When the time comes to consume more of the product, the consumer can again pull back the flap 220 using the pull tab 240, and thus gain access to the remaining product. Such reopening and reclosing of the package 200 can continue until the product 280 is fully consumed and the package 200 is discarded.

Figure 7:
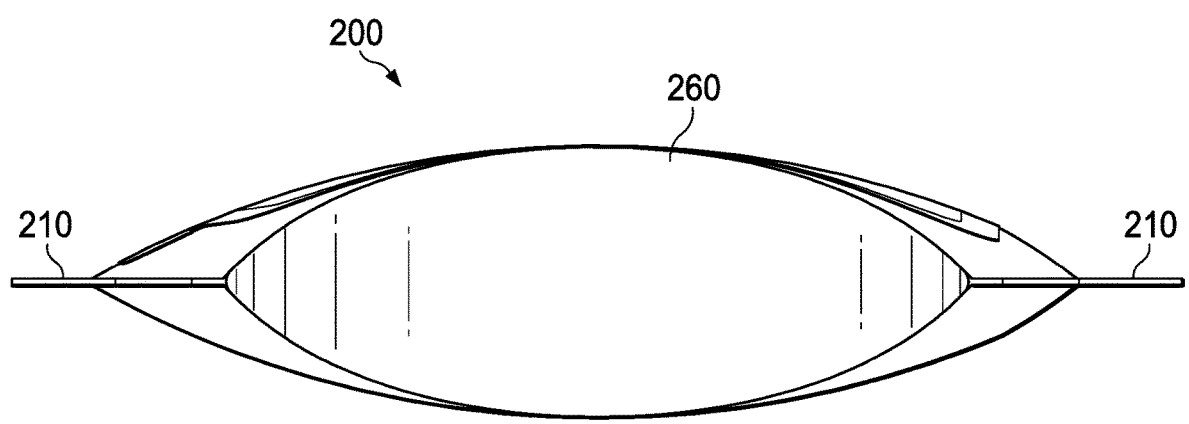
FIG. 7 illustrates a side view of the recloseable package illustrated in the FIGS. 2-6.

Referring now to FIG. 7, illustrated is a side view of the recloseable package 200 illustrated in the FIGS. 2-6. From this side view, the end seals 210 can be seen at the top and bottom of the package 200, as well as the location of the rigid sidewalls 260 between the end seals 210. In this embodiment, the rigid sidewalls 260 are located immediately between the end seals 210 in that the points at the opposing ends of the rigid sidewalls 260 are immediately adjacent the area at which the end seals 210 begin.

Also in this embodiment, the rigid sidewalls 260 are manufactured in an elliptical shape, where the foci of the ellipse are located on the opposing outermost edges of the rigid sidewalls 260. This specific shape provides a shape similar to an American football, where the opposing horizontal ends terminate in points or only very slightly round ends. By providing the opposing ends of the rigid sidewalls 260 as points, or near-points, the flexible material comprising the front and back surfaces of the package 200 curve in a convex manner, and meet immediately adjacent to the points of the rigid sidewalls 260 and are joined to form the top and bottom end seals 210. In addition, the size of the rigid sidewalls 260 in an exemplary embodiment is a height of about 1.7 inches and a width of about 4.25 inches, which is a ratio of about 2.5:1 in width to height. This exemplary size for the rigid sidewalls 260 results in a size for the package that is substantially the same size as a pillow bag of the same amount of product. However, other sizes for the rigid sidewalls 260, or ratio of width to height, may also be employed.

In addition to their shape, the rigid sidewalls 260 may be formed as part of the package film or composite film that comprise the remainder of the package 200. In other embodiments, the rigid sidewalls 260 can be manufactured as separate components and manufactured from one or more rigid or semi-rigid materials such as cardboard, card stock, paperboard, fiberboard, or any one or more of such materials. In such embodiments, the rigid sidewalls 260 may then be adhered or otherwise attached to the sides of the flexible film(s) or other material comprising the package 200. Additionally, the use of rigid sidewalls 260 also provides the opportunity for additional labeling or advertising on the package 200. More specifically, a conventional flexible pillow bag for snacks may have raised sides since the pillow bag is inflated when coming from the factory. However, even in the inflated state, the sides of such a pillow bag are still curved since they are integral with both the front and back of the package. But with the rigid sidewalls 260 of the disclosed principles, though not required, the rigid sidewalls 260 may be formed vertically straight and thus provide a surface for additional labeling or advertising that is more clearly readable from a side view of the package than the flexible sides of a typical pillow bag. This is the case even in those embodiments of the disclosed principles where the rigid sidewalls 260 are horizontally curved to provide the hourglass shape illustrated in FIG. 2.

The flexible film that may be employed to manufacture the package 200 may be a composite or laminate film suited for use on vertical form and fill machines for the packaging of food products. Such an exemplary film may comprise an outer layer that is typically an oriented polypropylene (OPP) layer, as well as an inner layer that is usually a metalized OPP. The use of a thermoplastic polymer, such as OPP or polyethylene terephthalate (PET), for the outer layer and the inner layer makes it possible to heat seal the edges of the package 200 to form one or more of the seals on the package 200. Sandwiched between the outer layer and inner layer may also be a middle layer, which is typically either an adhesive or polyethylene. The inner, metallic layer can itself be a layered laminate and that could contain a sealant layer on what would be the inside, or product side, of the package 200. This sealant layer is typically formed of a ter-polymer, composed of ethylene, propylene, and butylenes. External printing for the package 200 is done on the inside of the outer layer and becomes sandwiched between the middle layer and outer layer. Printing on the interior of the package 200 would be done on the outside of the inner layer and sandwiched between the middle layer and inner layer. Also, although the inner and outer layers are described as only two individual layers, either or both of these layers can also each include one or more layers. For example, a metallic layer, such as aluminum, between the OPP inner layer and the adhesive or polyethylene middle layer can provide a light and oxygen barrier to retain taste and freshness of the product contained in the package 200. Other materials used in these layers could be polyester, paper, polyolefin extrusions, adhesive laminates, polyethylene and other such materials, or a layered combination of one or more of these.

In sum, embodiments of rigid recloseable packages according to the disclosed principles, such as those illustrated in FIGS. 2-7, provide a vertically structural package that protects the contents prior to opening better than a typical pillow bag inflated from the factory. Also, when opened, the rigid sidewalls of such packages create vertically rigid structural support that give the package vertical structure that remains even when opened, and that make access to the product within much easier for the consumer. Moreover, the vertical structural support provided by the rigid sidewalls allow resealing the package to be not only easier, but protects any remaining product from being crushed when pressing the recloseable flap to reseal the package. Also, the vertical support provided by the rigid sidewalls offer such protection against crushing of the product within, whether it is while the package is still sealed from the factory before initial consumption or after the package is opened and then resealed for storage. The rigid sidewalls, especially those horizontally curved in a concave manner, also create a unique shape to the disclosed package, and contribute to its overall aesthetics, while allowing the rigid recloseable package to be stored, shipped and displayed in the same manner as a conventional pillow bag. The pull tab on the resealable flap can be placed in the slot in the top end seal to keep the flap back and thus not inadvertently close while the consumer is accessing the product in the package. This provides a large, easily accessible opening in the package, that is much easier to use by a consumer without touching their fingers or hand on the inner sides of the package. Inner printing may also be utilized in the large opening, which adds to the unique consumer experience provided by the rigid, resealable package of the disclosed principles.

Figure 8:
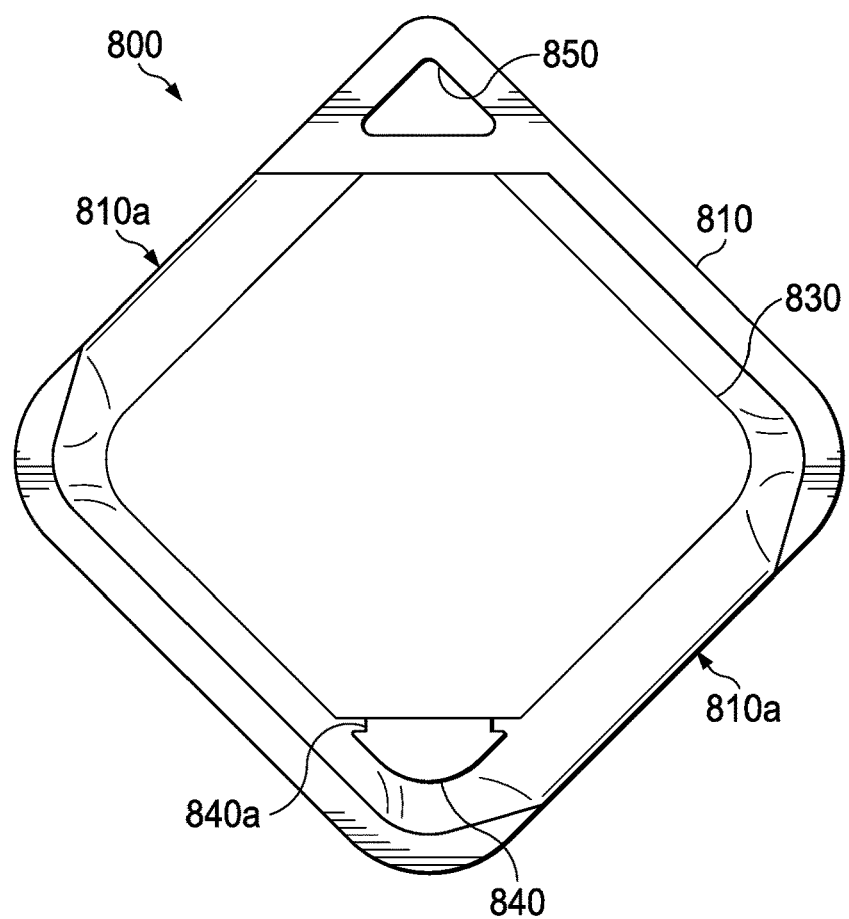
FIG. 8 illustrates a front view of another embodiment of a recloseable snack package designed and manufactured in accordance with the disclosed principles.

Turning now to FIG. 8, illustrated is a front view of another embodiment of a recloseable snack package 800 designed and manufactured in accordance with the disclosed principles. In this embodiment, the package 800 is again a single serving sized bag, which typically holds about 1-2 oz. of product. This embodiment of a package 800 is also predominately flexible, but is formed in a diamond shape. As such, the top and bottom ends of the package 800 are corners of the diamond shape. Also, because of the diamond shape, in some embodiments all of the edges 810 of the package 800 and all four corners may be sealed using conventional technology, such as ultrasonic welding. In other embodiments, less than all of the edges 810 need to be sealed, as the flexible composite film may simply be folded along one or two edges, and the remaining edges sealed in such manner. For example, in the illustrated embodiment the folded edges 810a are the bottom right edge and the top left edge of the package 800, while the remaining three edges 810 and all four corners have been ultrasonically welded. In embodiments where two opposing edges are folded rather than sealed, the package may still be manufactured by rolling the package film into a tube shape, and then filling the package 800 using typical vertical form and fill equipment. The other two edges 810, as well as all four corners, can then be sealed using any desired technique.

While it should be noted that such a diamond shaped flexible package may also be manufactured as a non-recloseable package, this illustrated embodiment of the package 800 does include a recloseable flap 820 on the front of the package 800, which is used to both open and reclose the package 800. In embodiments where the package is not recloseable, the flap 820 may simply be the means by which the package 800 is opened, but is not configured for resealing the package 800. Moreover, in such non-resealable embodiments, the flap 820 may be completely removable from the package 800. However, the illustrated flap is a recloseable flap 820 that may be included on the package 800 in any of a number of different ways. In one embodiment, the package 800 may include score lines (not illustrated) in the packaging material underneath the flap 820 which define the opening in the front of the package 800 where the product is accessed by a consumer. Such a scored layer may be a complete layer of package material, with its perimeter defined (substantially or completely) by score lines, with the flap 820 overlaying it. As the flap 820 is then lifted, the underlying scored layer is torn from the remainder of the package 800 by the lifting flap 820. In another embodiment, the flap 820 itself provides the package material, and includes the score lines, along with the edges of the flap 820 offset from the score lines. In either embodiment, the flap 820 has edges 830 around its perimeter that include an adhesive layer (not illustrated) that is then affixed over the scored front section of the package 800, while the top corner area of the flap 820 is either integrally formed with the remainder of the front surface of the package 800, or permanently attached to it, to keep the flap 820 attached to the package 800. The recloseable flap 820 includes a pull tab 840 proximate to the bottom corner of the package 800. The pull tab 840 is typically free from adhesive so that a consumer can easily grasp the pull tab 840 and then pulls it upward and back away from the pull tab's 840 original position (towards the top corner). As the flap 820 is pulled back with the pull tab 840, the package 800 tears along the score lines to create a large opening on the front of the package 800.

The pull tab 840 may also include retention features 840a on its opposing ends. The retention features 840a can be used to retain the flap 820 within an aperture 850 that may be formed in the top corner of the package 800. In this embodiment, the retention features 840a comprise small pointed triangular flaps extending from the opposing ends of the pull tab 840, and may be configured to be received through the aperture 850. Notches are formed next to the triangular flaps, and are configured to receive corresponding edges of the top corner at the outer portions of the aperture 850 to assist in retaining the pull tab 840 therein. The aperture 850 may be formed, as illustrated, as a triangular shaped opening, with a top corner of the triangular opening 850 functioning as a hanging hole that is sized to receive a hanging peg of a product display rack so that the package 800 may also be hung on the display rack. Additional details regarding the opening and reclosing of the package 800 are discussed below.

Figure 9:
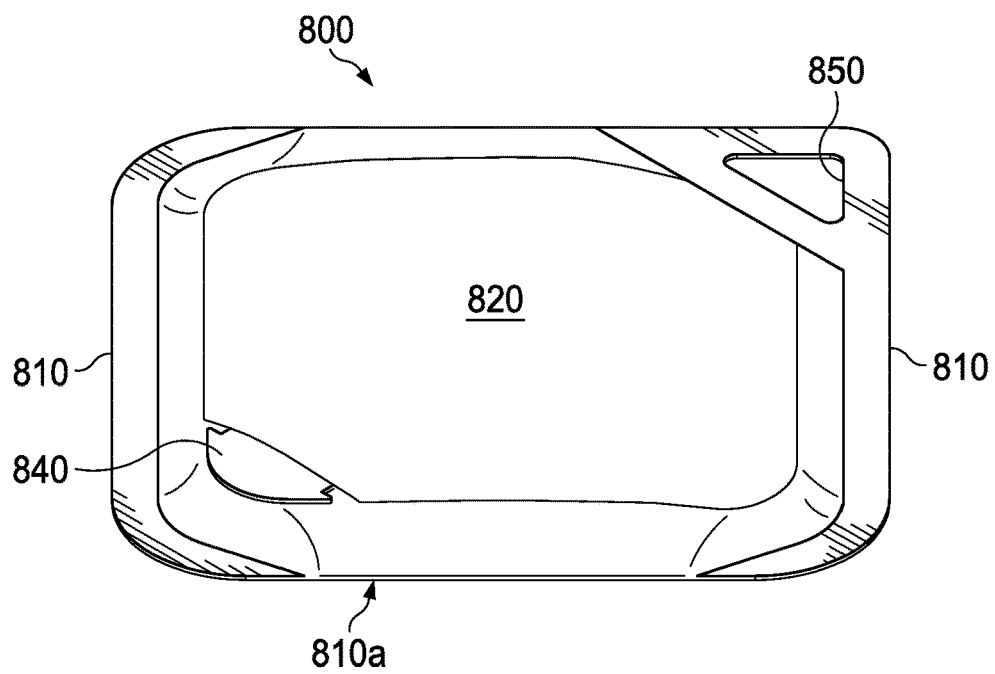
FIG. 9 illustrates a perspective view of the recloseable package illustrated in FIG. 8.

Turning to FIG. 9, illustrated is a perspective view of the recloseable package 800 illustrated in FIG. 8. In this figure, the curvature of the package 800 can be seen, which is substantially equal in all directions. Also, the recloseable flap 820 can be seen following the curvature of the package 800. In addition, the pull tab 840 can be seen, which is not adhesively bound to the front surface of the package as the flap 820 is, which in turn permits easy lifting and grasping by a consumer.

Also visible from this perspective of the package 800 is the low profile of the thickness of the package 800. More specifically, such an embodiment of a package 800 according to the disclosed principles provides a profile or thickness significantly thinner than the thickness of conventional pillow bag. This results in a more compact package 800, which in turn permits a consumer to more easily carry the package 800 as compared to a traditional pillow bag. For example, a typical single serving pillow bag for snacks such as corn chips is about 1.5 inches thick when sealed at the factory with the ambient air trapped therein. In contrast, a factory sealed single serving package 800 like the example of FIG. 9 is only about 1 inch thick when sealed. Not only is this thinner profile more convenient for consumers to transport such packages 800, but it also allows more packages 800 to be shipped in the same size case, as well as more packages 800 to be displayed in a product display rack than conventional pillow bags. Also from the perspective of FIG. 9, one of the two folded edges 810a of the package 800, as differentiated from the sealed edges 810 found on the other two sides of the diamond shaped package 800, may be seen more clearly.

Figure 10:
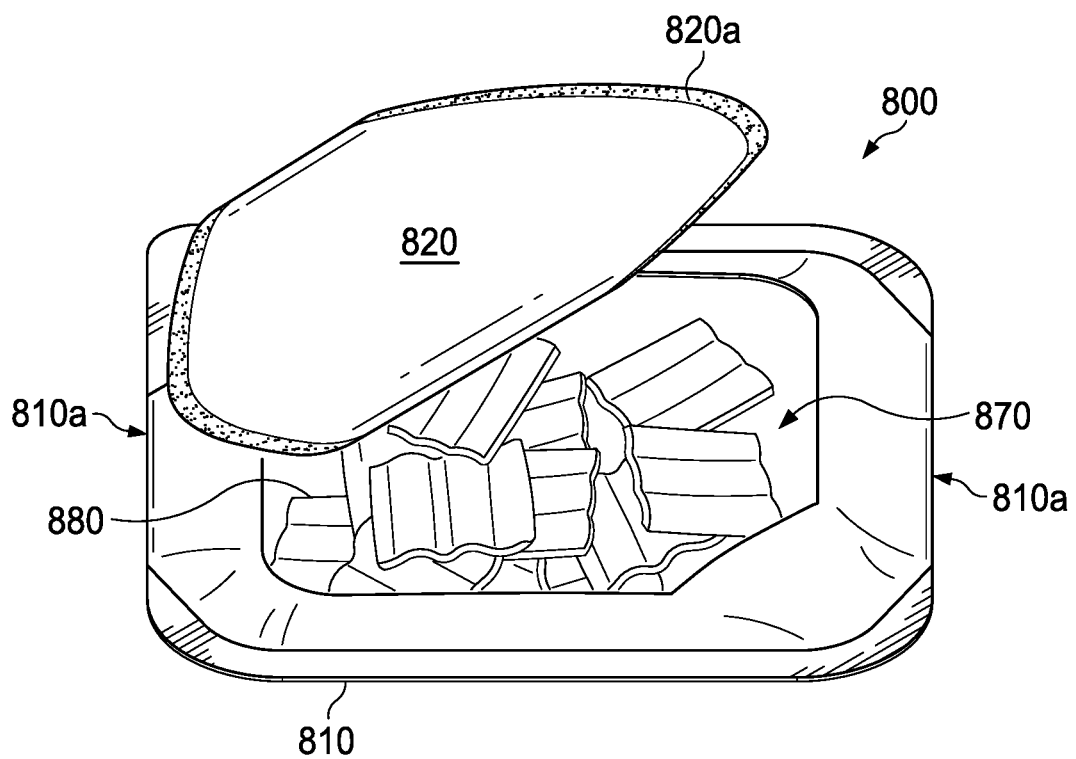
FIG. 10 illustrates another perspective view of the diamond shaped recloseable package of FIGS. 8 and 9 in an opened state.

Looking now at FIG. 10, illustrated is another perspective view of the diamond shaped recloseable package 800 of FIGS. 8 and 9 in an opened state. As illustrated, the recloseable flap 820 has been pealed upward and back, towards the top end of the package 800. As the flap 820 is so lifted and pulled, the score lines or similar perforations formed in the film over the package's opening, either under the flap 820 or comprising part of the flap 820, are torn to separate the flap 820 from the flexible film comprising the remainder of the package 800. From the factory, the snack product is sealed within the package 800, and thus the tearing of the score lines by pulling the flap 820 provides the initial opening of the package 800.

As the package 800 is opened in this manner, the interior 870 of the package 800 is exposed, and the product 880 held within the package 880 is also exposed. As with other embodiments of packages according to the disclosed principles, inner package printing may also be employed within the interior 870 to enhance the consumer's visual experience when consuming the product 880. As discussed above, such inner-package printing could be ornamental designs, or could include images or text, which could convey a message or provide other information to the consumer, examples of which are discussed above.

Additionally, an adhesive border 820a located along the outer edge 830 of the resealable flap 820 can also be seen. This adhesive border 820a allows the recloseable flap 820 to be pulled back down over the opening of the package 800, permitting the flap 820 to reclose and even reseal the package 800 with the adhesive border sticking to the flexible film bordering the package opening in times when the consumer has chosen to save some of the product 880 for later consumption. As before, the type of adhesive 820a that may be employed is typically an adhesive that is non-toxic and safe for use around foods intended for human consumption. Moreover, an adhesive that is tacky enough to reclose the flap 820 down onto the face of the package 800 should be selected, but typically not one that is so tacky that it inadvertently can stick to the fingers or hand of the consumer.

Figure 11:
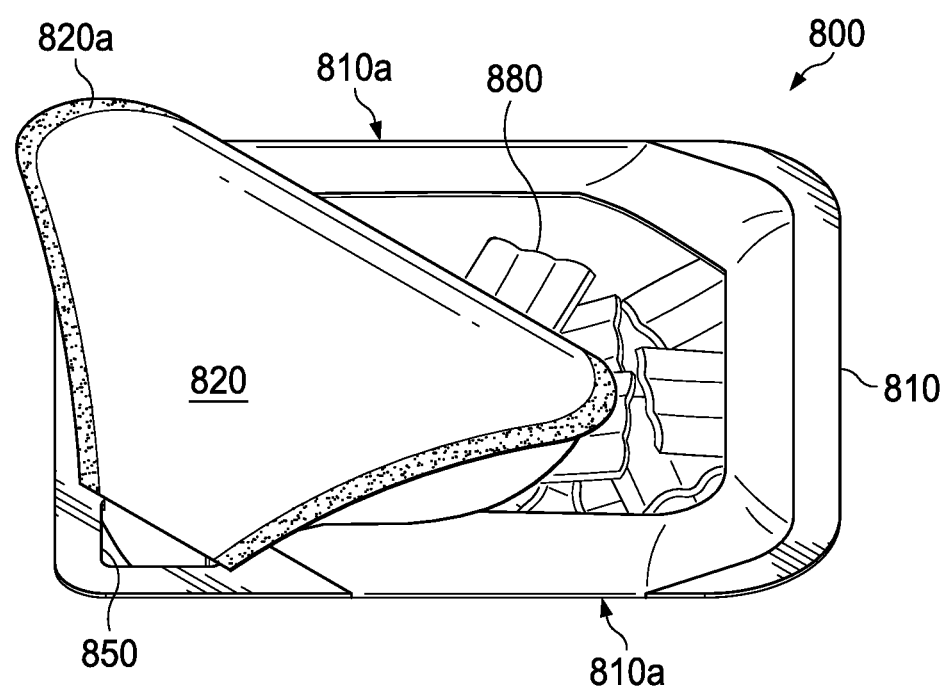
FIG. 11 illustrates another perspective view of the recloseable package of FIG. 10 in the fully opened state and viewed from the top corner of the package.

FIG. 11 illustrates another perspective view of the recloseable package 800 of FIG. 10 in the fully opened state, and viewed from the top corner of the package 800. In the fully opened state, the recloseable flap 820 has been pulled back fully to reveal the full opening of the package 800, has been rolled towards the top end corner seal of the package 800. As such, the pull tab 840 of the bottom corner of the flap 820 is retained within the aperture 850 formed in the top corner seal. With the flap 820 fully rolled back and retained by the aperture 850, the consumer can now easily reach the product 880 held in the package 800. In order to reclose the package 800, the consumer can pull the pull tab 840 from within the aperture 850, and thereafter roll the flap 820 back down towards the bottom corner and over the opening in the front of the package 800. The adhesive 820a along the edge 830 of the underside of the flap 820 will then adhere to the front surface of the package 800 around the opening, allowing the consumer to reclose and reseal the package 200 until a later time. When the time comes to consume more of the product, the consumer can again pull back the flap 820 using the pull tab 840, and thus gain access to the remaining product.

Figure 12:
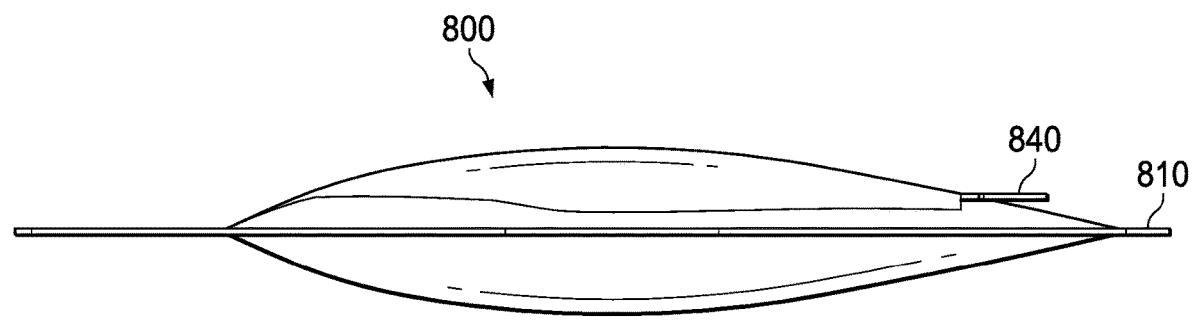
FIG. 12 illustrates a side view of the recloseable package illustrated in the FIGS. 8-11.

Referring now to FIG. 12, illustrated is a side view of the recloseable package 200 illustrated in the FIGS. 8-11. From this side view, the seals 810 can be seen at the top and bottom corners of the package 800, as well as the pull tab 840 used to peal the recloseable flap 820. Also from this side view, the slimmer profile of the filled package 800, e.g., about 1 inch thick, as compared to typical single serving pillow bags, which are about 1.5 inches thick, may be seen.

The flexible film that may be employed to manufacture the diamond shaped resealable package 800 may again be a composite or laminate film suited for use on vertical form, fill and seal machines for the packaging of food products. Such an exemplary film may be comprised of the one or more layers discussed above with respect to the package 200 of FIGS. 2-7. Also as with the package 200, external printing for the package 800 may be done on the inside of the outer layer and becomes sandwiched between the middle layer and outer layer, while printing on the interior of the package 800 could be done on the outside of the inner layer and sandwiched between the middle layer and inner layer.

Figure 13:
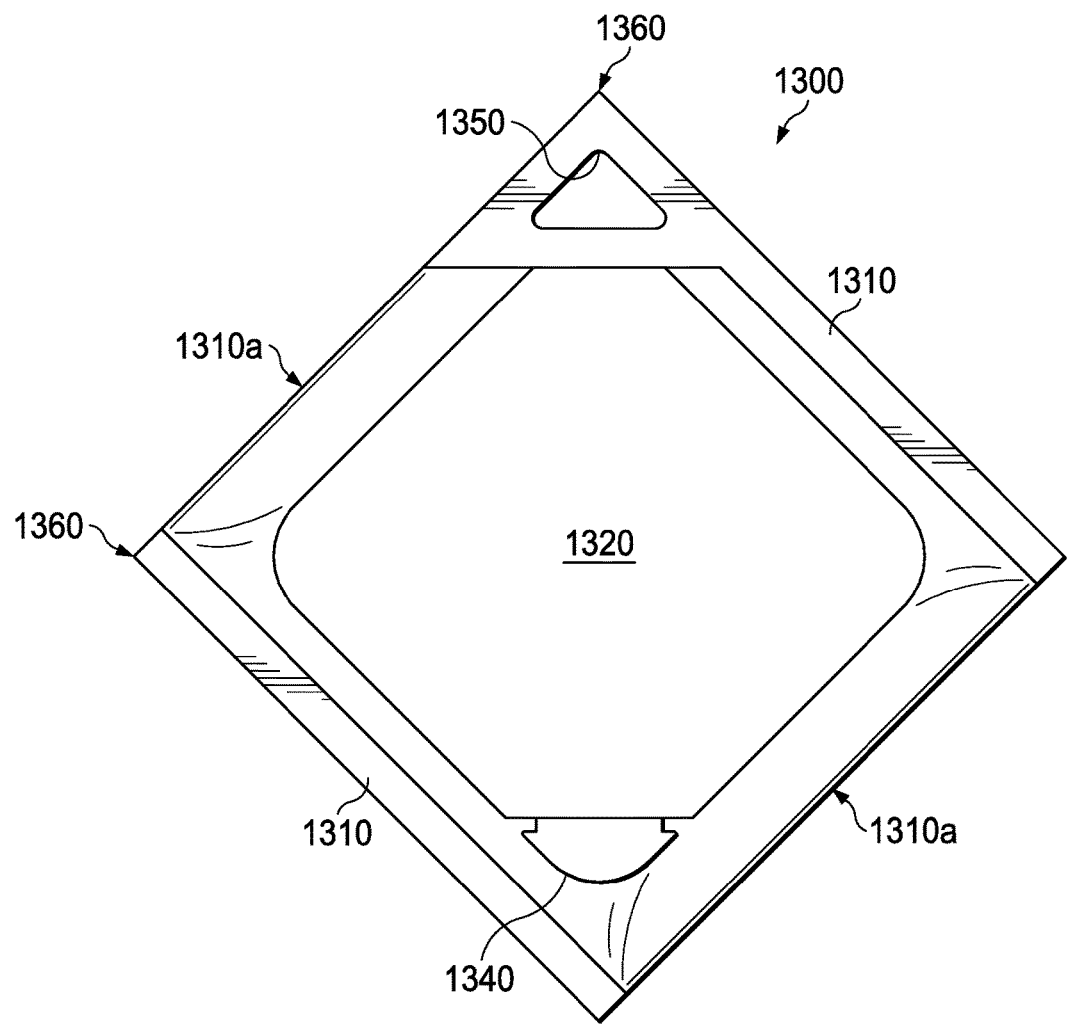
FIG. 13 illustrates a front view of another embodiment of a diamond shaped recloseable package designed and manufactured in accordance with the disclosed principles.

Turning finally to FIG. 13, illustrated is a front view of another embodiment of a diamond shaped recloseable package 1300 designed and manufactured in accordance with the disclosed principles. This embodiment is again formed with two sealed edges 1310 and two folded edges 1310a of the package 1300. This embodiment also includes a resealable flap 1320 formed on the front surface of the package 1300, as well as a pull tab 1340 formed at the bottom corner of the flap 1320. As shown, the pull tab 1340 is again formed with a shape that can be received within, and retained by, an aperture 1350 formed through the top corner of the package 1300.

This embodiment of a diamond shaped recloseable package 1300 differs from the prior diamond shaped package 800 discussed above in that this embodiment includes pointed corners 1360. The previous embodiment discussed above was formed with rounded corners of the diamond shape, which provides a different ornamental look to the package 800 than do the pointed corners 1360 of the embodiment illustrated in FIG. 13. By providing the corners 1360 as pointed rather than rounded, slightly more room may be provided in the interior of the package 1300 since the edges seals 1310 may be made in a straight manner. In packages 800 having rounded corners, the edges seals 810 may be formed with the same curvature as the radius of the rounded corners, so that the width of the seal at all the sealed edges is substantially uniform. In the embodiment illustrated in FIG. 8, the radius of the corners' curvature is about 0.5 inch on the left, right and bottom corners of the diamond shape, and a radius of curvature of about 0.25 inch on the top corner of the package 800. Of course, any radius of curvature may be employed for such embodiments. However, this following of the radius of curvature of the rounded corners can result in a small loss in the amount of space inside the package 800.

In sum, embodiments of diamond shaped packages according to the disclosed principles, such as those illustrated in FIGS. 8-13, provide a slimmer profile package (i.e., thickness) that can be constructed as single open packages or as packages that may be reopened and resealed repeatedly. This provides an advantage of occupying less space than conventional pillow bags, which tend to have a far thicker profile. While the disclosed slimmer profile packages may hold less product than a typical pillow bag, the slimmer packages provide the commensurate advantage of taking less space in both display racks and in bags or other means used by consumers to carry them. Also, the disclosed slimmer profile packages may prove well suited for smaller, more dense product than is typically sold in standard pillow bags. This makes them ideal for consumers willing to trade some product for easier transportability of the snack package, and certainly pricing could be reduced, if appropriate depending on the product packaged, to compensate for the reduced amount of product. Exemplary embodiments present the package in a diamond shape, where the bag is considered straight with respect to labeling when the bag is positioned on the bottom corner of the diamond shape as opposed to simply presenting the package as a square bag. With this selected orientation of the bag, the pull tab portion of the film grasped by the consumer to peel back the resealable flap is one of the corners of the film, which is also shaped in a diamond corresponding with the diamond shape of the package. The pull tab on the resealable flap can be placed in the slot in the top corner of the diamond package to keep the flap back and thus not inadvertently close while the consumer is accessing the product in the package. This provides a large, easily accessible opening in the package that is much easier to use by a consumer. Inner printing may also be utilized in the large opening, which adds to the unique consumer experience provided by the diamond shaped embodiments of the resealable package of the disclosed principles.

In the numerous embodiments of the inventive subject matter disclosed herein, such embodiments may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the claims reflect, inventive subject matter lies in less than all features of a single disclosed embodiment. Thus the following claims are hereby incorporated into the Detailed Description, with each claim standing on its own as a separate embodiment.

The description has made reference to several exemplary embodiments. It is understood, however, that the words that have been used are for description and illustration, rather than words of limitation. Changes may be made within the purview of the appended claims, as presently stated and as amended, without departing from the scope and spirit of the disclosure in all its aspects. Although this description makes reference to particular means, materials and embodiments, the disclosure is not intended to be limited to the particulars disclosed; rather, the disclosure extends to all functionally equivalent technologies, structures, methods and uses such as are within the scope of the appended claims.

What is claimed is:

1. A reclosable package, comprising:
    a flexible package body comprising a flexible material rolled into a rectilinear tubular shape having openings at top and bottom ends, the flexible package body having a front surface and a back surface opposing the front surface, the front and back surfaces separated by opposing sides and opposing top and bottom end seals closing the openings at the top and bottom ends;
    a peelable flap located on the front surface and connected to the front surface at a portion of the perimeter of the flap, the flap entirely covering an opening through the front surface of the package sized for accessing product held within the package;
    a pull tab connected to the flap;
    a rigid sidewall adhered externally on each of the opposing sides, each rigid sidewall providing opposing inward concave curvatures to the opposing sides to provide an hourglass shape to the package from the top end seal to the bottom end seal, and having a rigidity sufficient to provide structural support to the opposing sides to maintain separation of the front and back surfaces such that they maintain a thickness for the package, thereby forming a space therebetween for holding the product within the recloseable package; and
    an aperture formed through a portion of the top end seal.

2. A package according to claim 1, wherein the rigid sidewalls each have an elliptical shape.

3. A package according to claim 1, wherein longitudinal outer edges of the rigid sidewalls are positioned immediately adjacent to the top and bottom end seals of the package.

4. A package according to claim 1, wherein each of the rigid sidewalls has height to width ratio of 1:2.5, where the width of each sidewall is measured longitudinally between the top and bottom end seals.

5. A package according to claim 4, wherein each of the rigid sidewalls have a height of about 1.7 inches and a width of about 4.25 inches.

6. A package according to claim 1, wherein the rigid sidewalls each comprise a radius of curvature of about 3.0 inches.

7. A package according to claim 1, wherein the top and bottom end seals comprise opposing convex curvatures.

8. A package according to claim 1, wherein material comprising the rigid sidewalls are selected from cardboard, card stock, paperboard, fiberboard, plastic, film, laminate or a combination thereof.

9. A package according to claim 1, wherein the flap comprises the flexible material.

10. A package according to claim 1, wherein the front surface comprises score lines in the flexible material under the flap that define the perimeter of the opening, and wherein the flap is configured to create the opening by tearing the flexible material along the score lines when lifted from the front surface.

11. A package according to claim 1, wherein the pull tab comprises retention features configured to retain the pull tab within the aperture thereby holding the flap away from the front surface of the package.

12. A package according to claim 1, further comprising printing on an interior portion of package.

13. A package according to claim 1, wherein the flap is a reclosable flap connected to the front surface at a portion of the perimeter of the reclosable flap.

14. A package according to claim 13, further comprising a resealable adhesive disposed around an underside of a remainder of the perimeter of the reclosable flap, the adhesive configured to hold the reclosable flap onto the front surface thereby covering the opening.

15. A package according to claim 1, wherein the pull tab is located along an area of the perimeter of the flap opposite the portion of the perimeter connected to the front surface.

16. A reclosable package, comprising:
a flexible package body comprising a flexible material rolled into a tubular shape having openings at top and bottom ends, the flexible package body having a front surface and a back surface opposing the front surface, the front and back surfaces separated by opposing sides and opposing top and bottom end seals closing the openings at the top and bottom ends, wherein the top and bottom end seals comprise opposing convex curvatures, and wherein an aperture is formed through a portion of the top end seal;
a peelable flap located on the front surface and connected to the front surface at a portion of the perimeter of the flap, the flap entirely covering an opening through the front surface of the package sized for accessing product held within the package;
a pull tab connected to the flap, the pull tab comprising retention features configured to retain the pull tab within the aperture thereby holding the flap away from the front surface of the package; and
a pair of rigid sidewalls adhered externally on corresponding ones of the opposing sides, the rigid sidewalls comprising:
longitudinal outer edges positioned immediately adjacent to the top and bottom end seals of the package,
opposing inward concave curvatures providing an hourglass shape to the package from the top end seal to the bottom end seal, and
rigidity sufficient to provide structural support to the opposing sides to maintain separation of the front and back surfaces such that they maintain a thickness for the package, thereby forming a space therebetween for holding the product within the reclosable package.

17. A package according to claim 16, wherein the rigid sidewalls each have an elliptical shape.

18. A package according to claim 16, wherein each of the rigid sidewalls has height to width ratio of 1:2.5, where the width of each sidewall is measured longitudinally between the top and bottom end seals.

19. A package according to claim 16, wherein material comprising the rigid sidewalls are selected from cardboard, card stock, paperboard, fiberboard, plastic, film, laminate or a combination thereof.

20. A package according to claim 16, wherein the flap comprises the flexible material.

21. A package according to claim 16, wherein the front surface comprises score lines in the flexible material under the flap that define the perimeter of the opening, and wherein the flap is configured to create the opening by tearing the flexible material along the score lines when lifted from the front surface.

22. A package according to claim 16, further comprising printing on an interior portion of package.

23. A package according to claim 16, wherein the flap is a reclosable flap connected to the front surface at a portion of the perimeter of the reclosable flap.

24. A package according to claim 23, further comprising a resealable adhesive disposed around an underside of a remainder of the perimeter of the flap, the adhesive configured to hold the flap onto the front surface thereby covering the opening.

25. A package according to claim 16, wherein the pull tab is located along an area of the perimeter of the flap opposite the portion of the perimeter connected to the front surface.

* * * * *